United States Patent [19]
Kasai et al.

[11] Patent Number: 5,332,382
[45] Date of Patent: Jul. 26, 1994

[54] MOTOR-DRIVEN VERTICAL TYPE INJECTION MOLDING APPARATUS

[75] Inventors: Shozo Kasai, Kawasaki; Yozo Tohbo, Yokohama; Norio Nikaido, Tsuchiura; Hirofumi Sugawara, Chichibu, all of Japan

[73] Assignee: Canon Kabushiki Kaisha, Tokyo, Japan

[21] Appl. No.: 951,755

[22] Filed: Sep. 28, 1992

[30] Foreign Application Priority Data

Sep. 30, 1991 [JP] Japan .................. 3-252395

[51] Int. Cl.$^5$ ............................. B29C 45/18
[52] U.S. Cl. ................... 425/145; 425/542; 425/451.6; 425/593
[58] Field of Search ............ 425/145, 542, 593, 451.6

[56] References Cited

U.S. PATENT DOCUMENTS

5,092,753  3/1992  Kumamura et al. ............... 425/145
5,129,808  7/1992  Watanabe et al. ............... 425/145

Primary Examiner—Tim Heitbrink
Attorney, Agent, or Firm—Fitzpatrick, Cella, Harper & Scinto

[57] ABSTRACT

A screw holding member in which a screw is rotatably provided is guided in a vertical direction by two guide shafts. A ball screw is integrally provided on an upper part of the screw holding member through a load cell. A ball nut screwed to the ball screw is provided internally in an upper base through bearings. A second toothed pulley is fixed to the upper part of the ball nut. The ball nut is rotated by an injection motor through the second toothed pulley. The ball screw and the screw 44 are vertically driven by rotation of the ball nut. The second toothed pulley is formed with a through-hole into which the ball screw is loosely fitted, whereby the ball screw does not protrude from the second toothed pulley even when the ball screw rises.

1 Claim, 12 Drawing Sheets

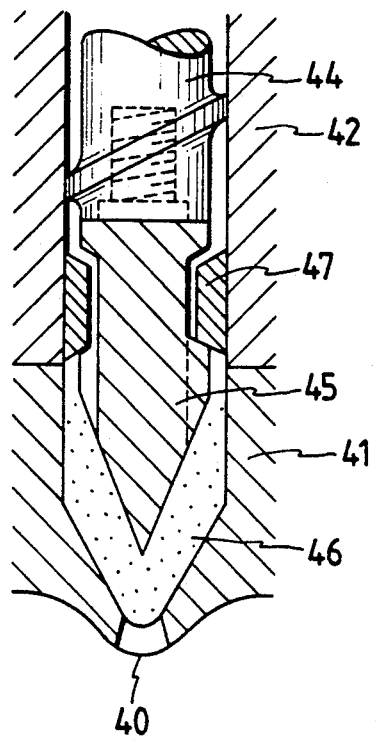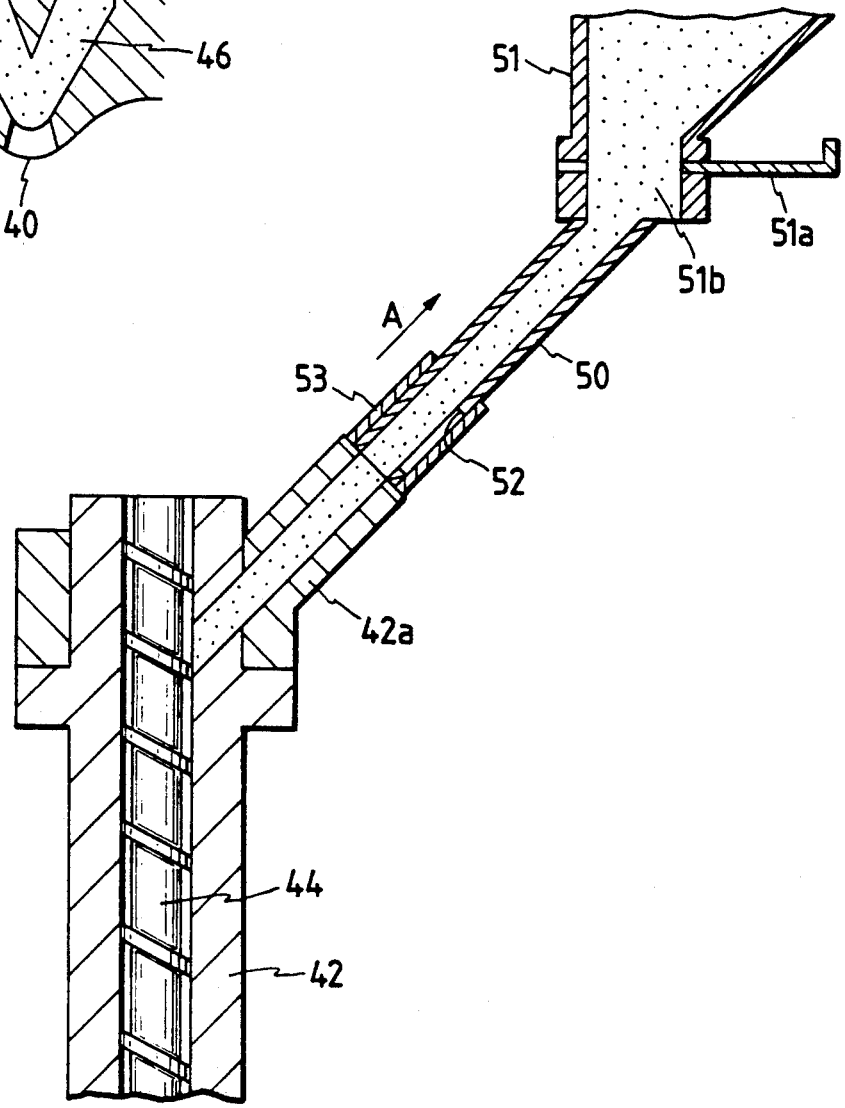

MOTOR-DRIVEN VERTICAL TYPE INJECTION MOLDING APPARATUS

BACKGROUND OF THE INVENTION

1. Field of the Invention

The present invention relates to a motor-driven vertical type injection molding apparatus in which a screw is vertically driven by a ball screw mechanism.

2. Related Background Art

FIG. 14 illustrates a known vertical driving mechansim for a screw in this type of motor-driven vertical type injection molding apparatus.

As depicted in FIG. 14, a ball screw 270 extending in the perpendicular direction is so provided in an upper base 273 serving as a molding apparatus body as to be unmovable in the axial direction but rotatable. Fixed to the upper end part of the ball screw 270 is a toothed pulley 276 to which a torque of an injection motor (not shown) is transferred. The ball screw 270 is rotated with rotation of the injection motor.

On the other hand, a screw (not shown) extending in the perpendicular direction is held at the lower portion of a screw holding member 258 so provided as to be incapable of rotating. A ball nut 275 screwed to the ball screw 270 is fixed to the upper part of the screw holding member 258.

Based on the construction described above, when the ball screw 270 is rotated by rotating the injection motor, the screw holding member 258 is driven upward and downward through the ball nut 275. On this occasion, when the screw holding member 258 is raised, the ball screw 270 protrudes below the ball nut 275. Hence, a relief portion 258b is formed under the ball nut 275 in the screw holding member 258 so that the ball screw 270 does not impinge on the screw holding member 258 even when the screw holding member 258 is raised.

The above-mentioned molding apparatus has an advantage that it is capable of being installed even in a narrow space because of a small installing area. But, since the molding apparatus has greater height than a horizontal type injection molding apparatus, the molding apparatus described above has a problem that it can not be installed in a low-ceilinged clean room or the like. Particularly, in the above-mentioned vertical driving mechanism for a screw, the ball screw is provided in the molding apparatus body, hence the screw holding member is provided with the ball nut and the relief portion of the ball screw. For this reason, the screw holding member has to increase in height corresponding to the ball nut and the relief portion. As a result, a height of the motor-driven vertical type injection molding apparatus increases.

SUMMARY OF THE INVENTION

It is a primary object of the present invention to provide a motor-driven vertical type injection molding apparatus constructed to reduce a height of the whole by contriving an arrangement of a vertical driving mechanism for a screw.

To accomplish said object, according to one aspect of the invention, there is provided a motor-driven vertical type injection molding apparatus, including a screw holding member for rotatably holding a screw accommodated in a heating barrel and extending in perpendicular direction, and an injection motor connected to the screw holding member through a vertical driving mechanism for converting a torque into a rectilinear force to rectilinearly move the screw, characterized in that the vertical driving mechanism comprises a ball screw integrally provided on the screw holding member and extending in the perpendicular direction, a ball nut rotatably provided internally in a molding apparatus body and screwed to the ball screw; and a rotation transferring means, provided on the upper part of the ball nut and formed with a through-hole into which the ball screw is loosely fitted, for transferring the torque of the injection motor to the ball nut, and that a length of the ball screw is set so that the upper end of the ball screw does not protrude from the rotation transferring means even when the ball screw rises up to the uppermost limit thereof.

The ball nut rotatably provided internally in the molding apparatus body is rotated with rotations of the injection motor through the rotary motion transferring means. On the other hand, the ball screw is screwed into the ball nut and is thereby driven up and down with rotations of the ball nut. The ball screw is integrally provided on the screw holding member. Hence, the screw holding member and further the screw are vertically driven together with the ball screw by the vertical driving of the ball screw.

Herein, the ball screw is integrally formed on the screw holding member, thereby eliminating the necessity for providing the screw holding member with the ball nut and the relief portion. Then, the ball nut is provided internally in the molding apparatus body, whereby the height of the ball nut can be absorbed within a thickness of the molding apparatus body. Further, when the ball screw rises, the ball screw is loosely fitted into the through-hole of the rotary motion transferring means provided on the upper part of the ball nut. Besides, a length of the ball screw is set so as not to protrude from the rotation transferring means. Therefore, the height corresponding to the relief portion, i.e., a protruded height of the ball screw from the ball nut, can be absorbed within a height of the rotation transferring means. Thus, the height of the motor-driven vertical type injection molding apparatus is reduced correspondingly to those of the ball nut and the relief portion by contriving the vertical driving mechanism for the screw.

BRIEF DESCRIPTION OF THE DRAWINGS

Other objects and advantages of the present invention will become apparent during the following discussion taken in conjunction with the accompanying drawings, in which:

FIG. 9 is an enlarged vertical sectional view illustrating a tip end portion (screw head portion) of the injection unit shown in FIG. 3;

FIG. 10 is an enlarged view showing a molding material supply unit shown in FIGS. 1 and 2;

DESCRIPTION OF THE PREFERRED EMBODIMENT

One embodiment of the present invention will be explained hereinafter with reference to the drawings.

Figure 4:
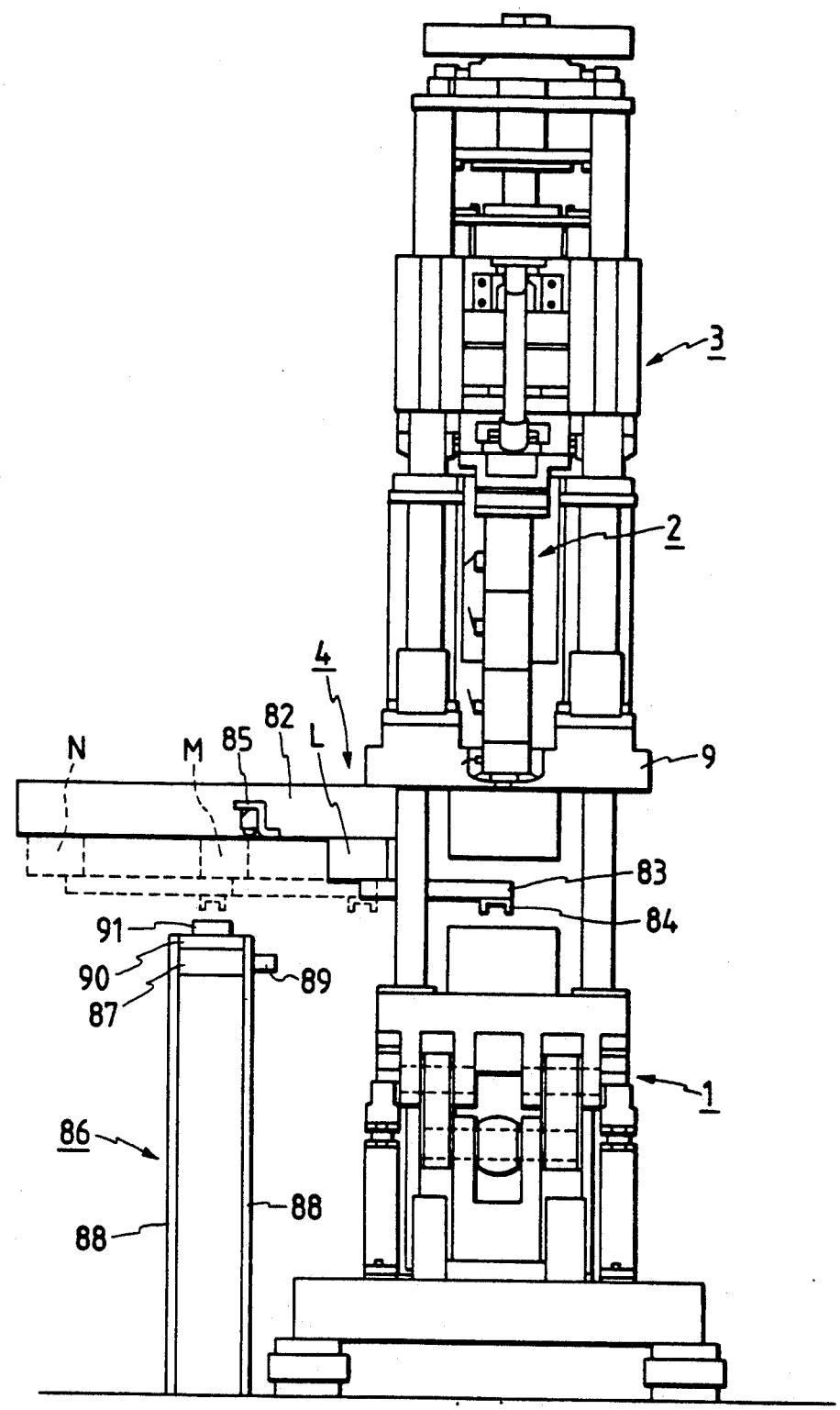
FIG. 4 is a view similar to FIG. 1 in which a molded product take-out unit, a conveyor, and the like are illustrated, showing a state where the mold is opened.

A vertical type injection molding apparatus (hereinafter referred to as "molding apparatus") in accordance with this embodiment includes, as illustrated in FIG. 4, a mold clamping unit 1, a cylinder unit 2 and an injection unit 3, which are aligned on a line perpendicular to a horizontal plane. The molding apparatus also has a molded product take-out unit (robot) 4. Detailed explanations about structures of the respective units 1, 2, 3, 4 will be sequentially given as below.

Mold Clamping Unit

Figure 1:
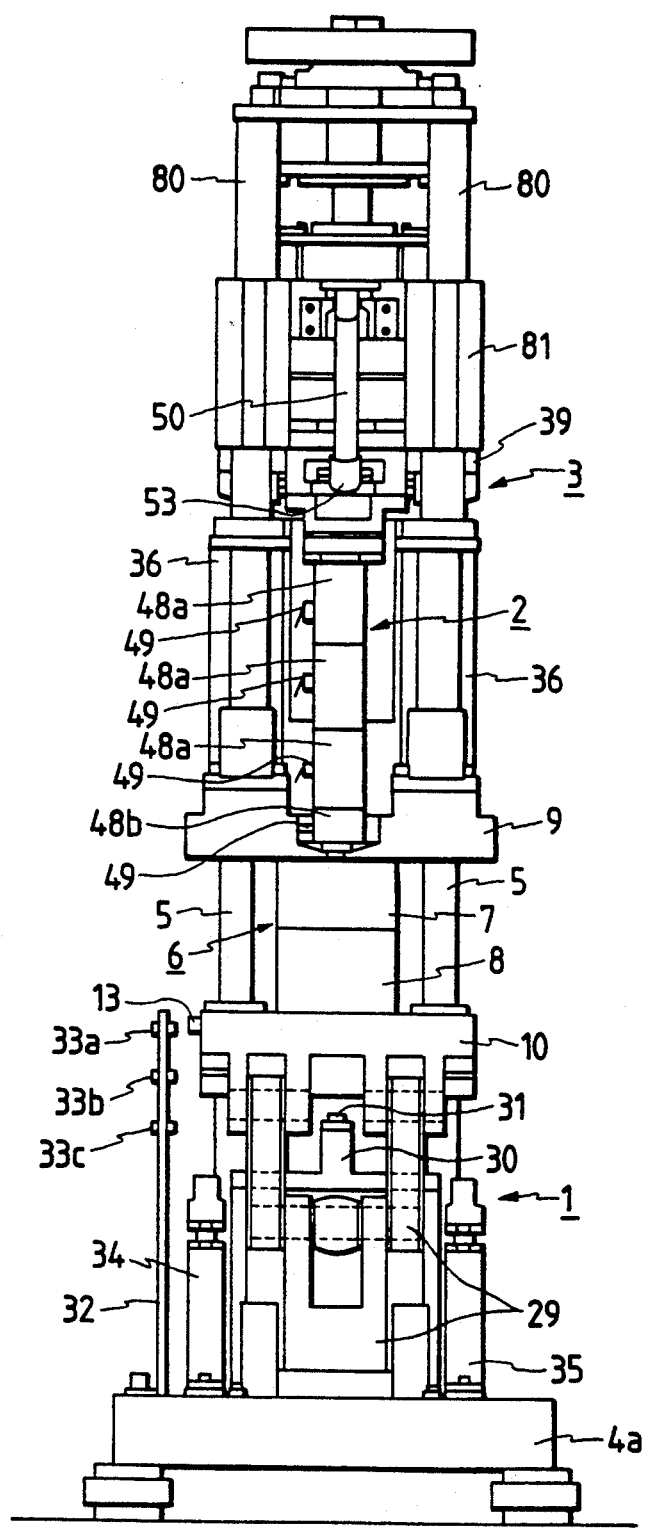
FIG. 1 is a schematic plan view of one embodiment of a vertical type injection molding apparatus according to the present invention, illustrating a state where a mold is closed.
Figure 2:
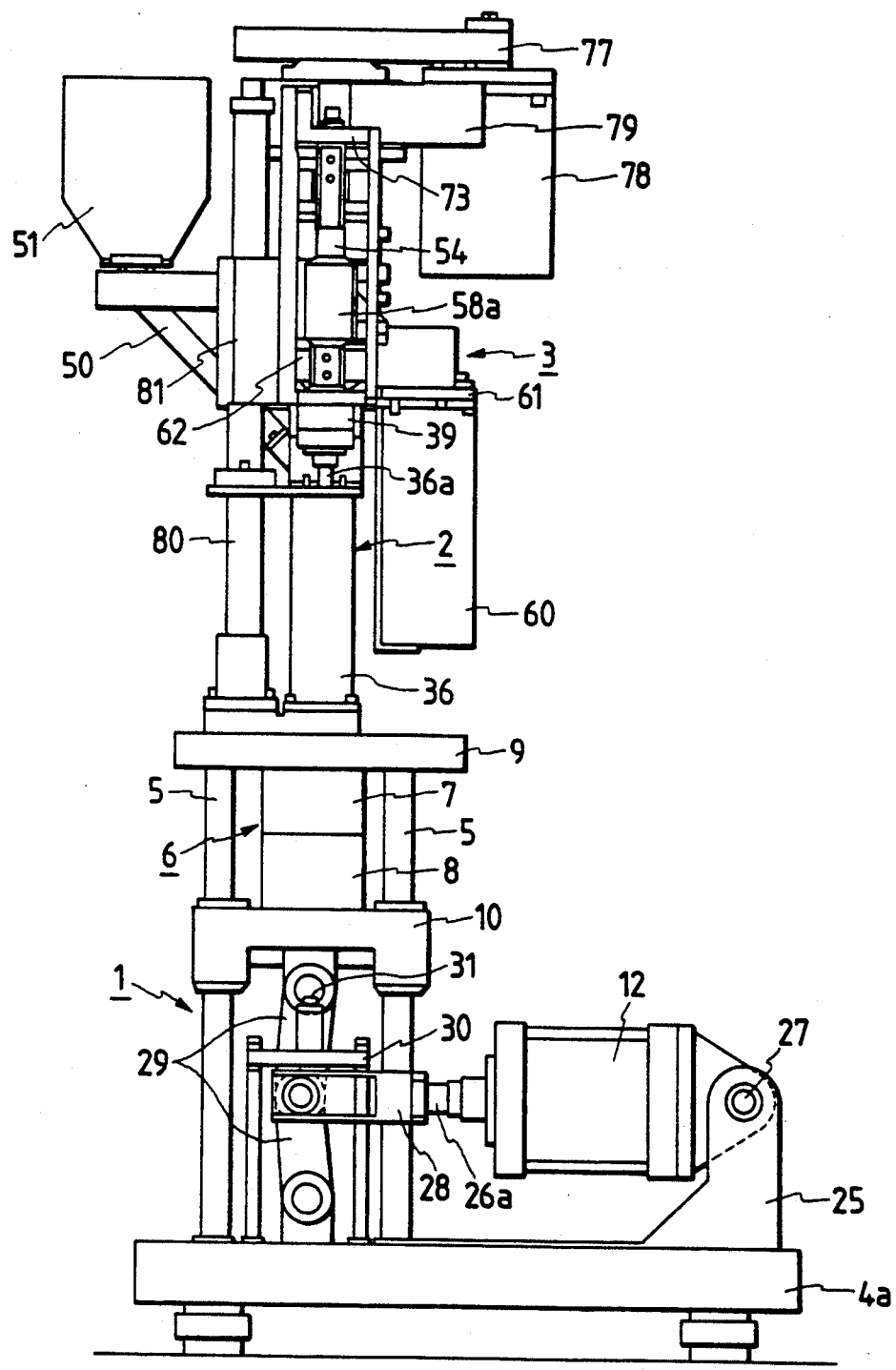
FIG. 2 is a schematic side view of FIG. 1.

As shown in FIGS. 1 and 2, four tie bars 5 are provided on the upper surface of a mount 4a of this molding apparatus integrally to extend in the vertical direction (up-and-down directions). A fixed platen 9 including a stationary die (upper die) 7 of the mold 6, which will be described later, is fixedly supported on the upper ends of the respective tie bars 5. Further, a movable platen 10 having a movable die (lower die) 8 of the mold 6 is moved in the vertical direction by a mold clamping air cylinder 12, which will be described later, while being guided by the four tie bars 5. An impingement member 31 positioned below the movable platen 10 is supported on the mount 4a through an impingement member support stay 30. When the movable platen 10 is lowered, the impingement member 31 is constructed to penetrate the movable platen 10. Further, the movable platen 10 is, as will be described later, integrally provided with a detection member 13 for positional detection.

The mount 4a is integrally provided with a bracket 25 protruding therefrom. A rear end portion of the clamping air cylinder 12 serving as a driving source of the movable platen 10 is rotatably supported by the bracket 25 through a clamping air cylinder support pin 27. A toggle link mechanism 29 is connected via a connecting member 28 to a rod 26a of the clamping air cylinder 12.

Both ends of the toggle link mechanism 29 are rotatably connected to the movable platen 10 and the mount 4a, respectively. When the rod 26a of the clamping air cylinder 12 is retracted, the toggle link mechanism 29 elongates, whereby the movable platen 10 rises along the four tie bars 5, and the mold 6 is closed and clamped (states shown in FIGS. 1 and 2). On the other hand, when the rod 26a of the clamping air cylinder 12 is protruded, the toggle link mechanism 29 is bent, and the movable platen 10 descends along the four tie bars 5. The mold 6 is thereby opened (states shown in FIGS. 4 and 5).

Figure 6A:
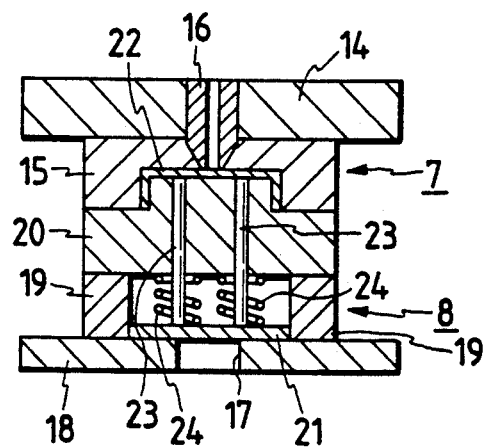
FIGS. 6A, 6B and 6C are vertical sectional views of the mold, FIG. 6A showing a state where the mold is closed, FIG. 6B showing a state where the mold is going to be opened, and FIG. 6C showing a state where the mold has completely been opened.
Figure 6B:
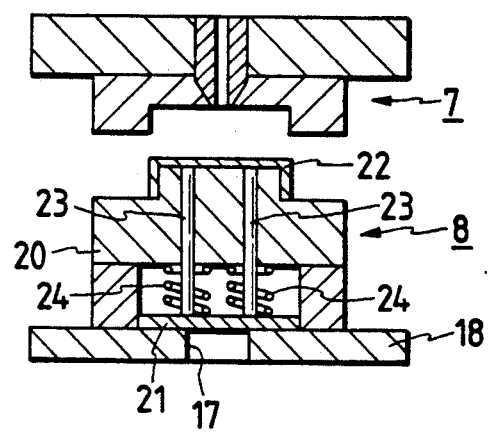

A structure of the mold 6 will be explained in detail with reference to FIGS. 6A, 6B and 6C, which illustrate states where the mold 6 is closed, going to be opened and has been completely opened, respectively. This mold is of a known hot runner type. The stationary die 7 thereof comprises a stationary-side fitting plate 14 fixed to the fixed platen 9 (see FIGS. 1 and 2), a stationary-side mold plate 15 and a hot chip bushing 16. On the other hand, the movable die 8 comprises a movable-side fitting plate 18 fixed to the movable platen 10 (see FIGS. 1 and 2) and formed with a through-hole 17, two spacer blocks 19 having a rectangular shape and a movable-side mold plate 20.

An ejector plate 21 is so provided between the two spacer blocks 19 as to be movable in the up-and-down directions. Two ejector pins 23 for ejecting a molded product 22 are so integrally provided on the upper surface of the ejector plate 21 as to protrude therefrom while penetrating the movable-side mold plate 20. Compression coil springs 24 provided between the two spacer blocks 19 are wound on the respective ejector pins 23, whereby the ejector plate 21 is biased downward by the two compression coil springs 24.

Figure 6C:
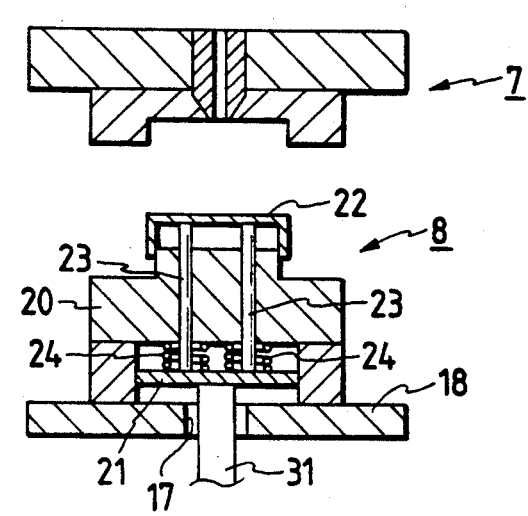

When the mold 6 is opened by the above-mentioned toggle link mechanism 29 (see FIGS. 1 and 2), as illustrated in FIG. 6C, the impingement member 31 described above passes through the movable platen 10 (see FIGS. 1 and 2) and the through-hole 17 of the movable-side fitting plate 18 and then impinges on the ejector plate 21. Thus, the ejector plate 21 is pushed up against the spring force of the two compression coil springs 24, thereby protruding from a cavity bottom surface of the movable-side mold plate 20 to eject the molded product 22 and to retain it.

Referring back to FIGS. 1 and 2, first, second and third sensors 33a, 33b, 33c, are fixedly supported sequentially from above on a first sensor support stay 32 provided on the mount 4a. The respective positions of the first, second and third sensors 33a, 33b, 33c are set so that the detection member 13 of the movable platen 10 is detected by the first sensor 33a when the movable platen 10 reaches a just-before-closing-complete position, the detection member 13 is detected by the second sensor 33b when the movable platen 10 is in a closing or opening midway position, and the detection member 13 is detected by the third sensor 33c when the movable platen 10 reaches an opening complete position. Further, two sets of direct-acting piston type shock absorbers 34, 35 are fixedly supported on the mount 4a. The shock absorbers 34, 35 each having the same structure and extending in the perpendicular position are positioned below the two side portions of the movable platen 10.

Figure 7:
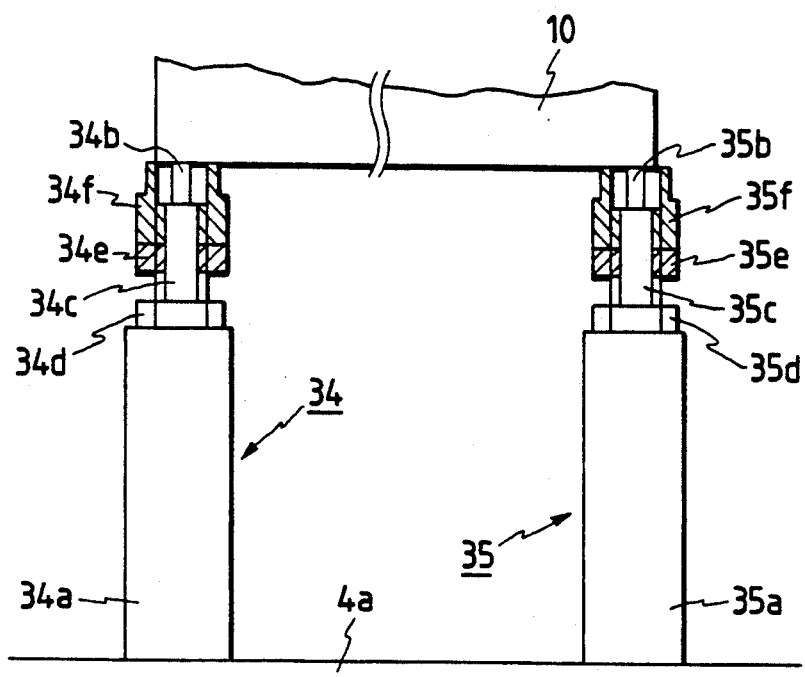
FIG. 7 is an enlarged view of shock absorbers shown in FIGS. 1 and 2, showing a state where each rod of the shock absorbers is depressed by the lower end surface of a movable platen when the mold has completely been opened.

Given herein is a detailed description of the structure of the shock absorber 34. As shown in FIG. 7, the shock absorber 34 comprises a body 34a fixed to the mount 4a, a screw shaft member 34c serving as a cylinder screwed into the body 34a, a rod 34b integral with a piston (unillustrated) slidably provided within the screw shaft member 34c, a height adjusting nut 34d screwed to the screw shaft member 34c and for adjusting a height position of the screw shaft member 34c and further that of the rod 34b with respect to the body 34a, a rotation preventive nut 34e sequentially screwed to the screw shaft member 34c, and a stopper nut 34f.

Just before completion of opening, the upper ends of the rods 34b, 35b of the two shock absorbers 34, 35 impinge on the lower surface of the movable platen 10. Further, with descent of the movable platen 10, the rods 34b, 35b intrude into the screw shaft members 34c, 35c by means of the movable platen 10. When the stopper nuts 34f, 35f impinge on the lower surface of the movable platen 10, the movable platen 10 comes to the lowermost limit position, and the descent thereof is stopped. The opening of the mold (not shown) is thus completed. Just before completing the opening of the mold, the rods 34b, 35b impinge on the lower surface of the movable platen 10, thereby relieving acceleration of the movable platen 10. Then, concurrently with or immediately after the impingement, as shown in FIG. 6, the two ejector pins 23 of the mold are thrust up by the impingement member 31. Thus, the acceleration of rising of the ejector pin 23 and an impulsive force acting thereon are relieved. When the movable platen 10 rises, the rods 34b, 35b are elastically returned and respectively raised.

Besides, elastically moved distances of the rods 34b, 35b of the shock absorbers are substantially equal to ejection lengths of the two ejector pins 23. Hence, lengths of the shock absorbers 34, 35 come to the minimum required, and a space occupied by the absorbers is small.

Moreover, the height adjusting nuts 34d, 35d are capable of adjusting the height positions of the screw shaft members 34c, 35c and further those of the rods 34b, 35b with respect to the bodies 34a, 35a. Besides, the height positions of the stopper nuts 34f, 35f with respect to the bodies 34a, 35a can be adjusted by regulating the screwing positions of the rotation preventive nuts 34e, 35e and of the stopper nuts 34f, 35f to the screw shaft members 34c, 35c. It is therefore possible to adjust the lowermost limit position of the movable platen 10.

Herein, a circuit for supplying the air to the clamping air cylinder will be explained.

Figure 8:
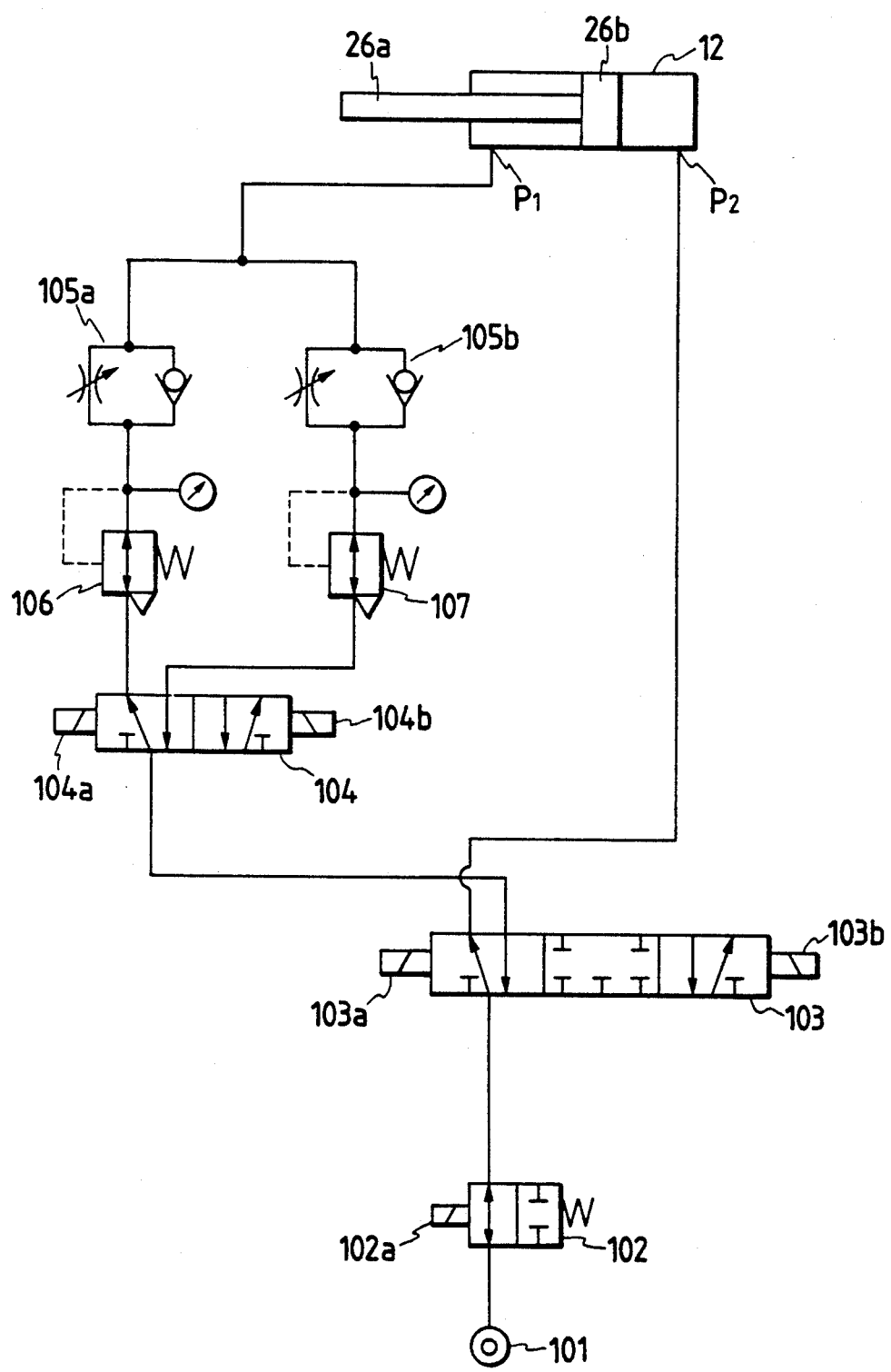
FIG. 8 is an air supply circuit diagram showing a clamping air cylinder.

FIG. 8 is a block diagram of the air supply circuit in a state where the mold is opened. As illustrated in this figure, a two-way valve 102 including a solenoid 102a and a first four-way valve 103 are interposed from the side of an air pressure source 101 between the air pressure source 101 and an opening-side port $P_2$ of the clamping air cylinder 12 including a rod 26a and a piston 26b. The valve 103 is of all ports blocked type of three positions and five ports and has two solenoids 103a, 103b. Further, a pressure switching circuit is interposed between a mold clamping-side port $P_1$ of the mold clamping air cylinder 12 and the first four-way valve 103. This pressure switching circuit comprises a second four-way valve 104 of two positions and five ports type and having two solenoids 104a, 104b, and a circuit connected in series to the valve 104, the circuit being formed by connecting in parallel a subcircuit having a speed controller 105a and a low pressure regulator 106 connected in series, to a subcircuit having a speed controller 105b and a high pressure regulator 107 connected in series. The solenoids 103a, 103b, 104a, 104b of the first and second four-way valves 103, 104 described above are electrified (driven) at predetermined timings, which will hereinafter be described, through an unillustrated control unit.

In the above-mentioned air supply circuit, as shown in FIGS. 1 and 8, when the mold is clamped, the one solenoid 104b of the second four-way valve 104 is electrified in advance, thereby effecting the switching to the high pressure regulator 107, i.e., the clamping pressure is set to the high pressure side. Then, when the one solenoid 103b of the first four-way valve 103 is electrified to perform the switching, the pressurized air is supplied into the clamping air cylinder 12 from the clamping-side port $P_1$, with the result that the mold 6 is smoothly closed by the high pressure. On the occasion of this closing, when the detection member 13 of the movable platen 10 is detected by the second sensor 33b, the other solenoid 104a of the second four-way valve 104 is electrified through the control unit described above, thereby effecting the switching to the low pressure regulator 106, i.e., the clamping pressure is set to the low pressure side. The mold 6 is closed by the low pressure. When the detection member 13 of the movable platen 10 is detected by the first sensor 33a, the solenoid 104b is electrified again, resulting in the switching to the high pressure regulator 107. Thus, the clamping is completed. On the occasion of the closing by the low pressure, the mold 6 is prevented from damage due to a permeation of foreign matters into a mold parting surface. When the mold is opened, the other solenoid 103a of the first four-way valve 103 is electrified.

Cylinder Unit

Figure 3:
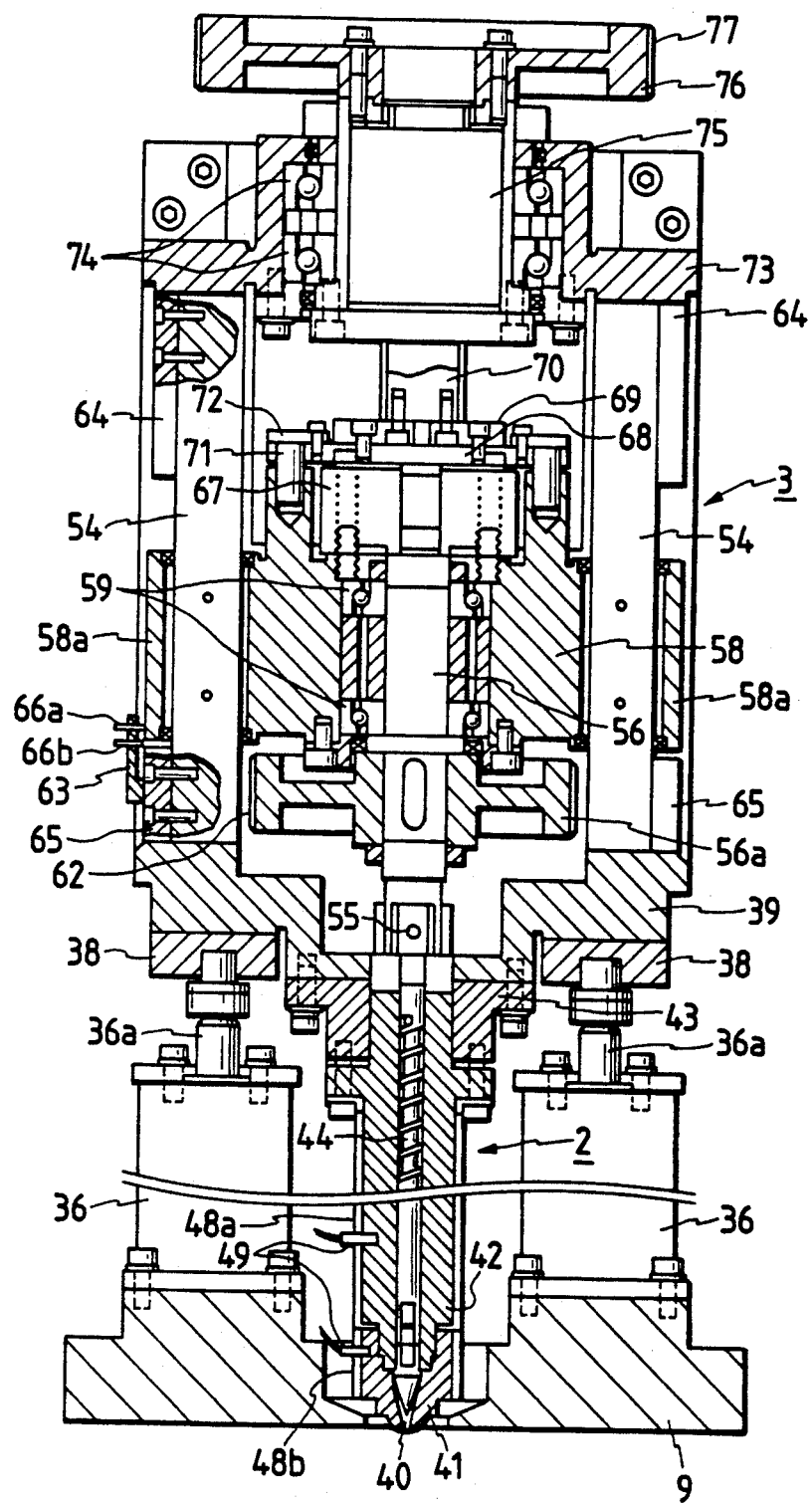
FIG. 3 is a vertical sectional view illustrating an injection unit shown in FIGS. 1 and 2.

As illustrated in FIGS. 1, 2 and 3, the lower ends of the two air cylinders 36 are each fixed to the upper surface of the end part of the fixed platen 9. A lower base 39 is connected via lower base connecting member 38 to each rod 36a of the air cylinders 36. The rods 36a of each air cylinder 36 are protruded or retracted, whereby the lower bases 39 are constructed to be raised or lowered.

A heating barrel 42 equipped with a cylinder head 41 having an open type nozzle 40 at its lower end part (tip part) is fixed through a heating barrel fitting member 43 to the lower surface of the central part of the lower base 39. A screw 44 is inserted into the heating barrel 42. The tip part of the screw 44 is, as illustrated in FIG. 9, provided with a screw head 45 and a backflow preventive ring 47 for preventing a backflow of a molten resin 46. The screw 44 is vertically moved and rotated by an individual separate driving means which will be described later.

Referring back to FIGS. 1, 2 and 3, three band heaters 48a for heating the heating barrel 42 are respectively attached to the outer curved surface of the heating barrel 42. Similarly to this, a band heater 48b is attached to the cylinder head 41 of the heating barrel 42. Detected respectively by four thermocouples 49 are temperatures of respective portions of the heating barrels 42 and of the cylinder head 41 that are wound with the band heaters 48a, 48b. As shown in FIG. 10, a hopper 51 communicates with the upper end part of the heating barrel 42 sequentially through a connecting member 42a integrally provided on the heating barrel 42 and a chute 50 conceived as a tubular member. When a shutter 51a is opened, a molding material (pellet) 51b dropping from the hopper 51 is supplied via the chute 50 to the upper end part of the heating barrel 42. Further, the supply of the molding material into the heating barrel 42 is stopped by closing the shutter 51a. The molding material fed to the heating barrel 42 is carried to a lower portion of the screw 44 while being molten with heat from the heating barrel 42 and shearing action of the rotating screw 44 in the heating barrel 42. When the molten resin is accumulated in the lower portion of the screw 44 enough to reach a predetermined quantity, the screw 44 is quickly moved downwards by driving means which will be described later. With this movement, the molten resin is injected into the mold 6 previously clamped (see FIGS. 1 and 2) from the nozzle 40 (see FIG. 3).

A drain port 52 is formed in the vicinity of the lower end part of the chute 50, i.e., the connecting part to the heating barrel 42. A tubular choke member 53 for blocking the drain port 52 is slidably fitted to the outer curved surface of the chute 50. Upon changing a material and a color of the molding material, the choking member 53 is moved up obliquely along the chute 50, as indicated by arrow A, thereby opening the drain port 52. Thus, the unnecessary molding material within the chute 50 is efficiently dischargeable via the drain port 52.

Injection Unit

The injection unit is defined as a driving unit for measuring a quantity of the molding material, which is molten, by transferring the molten resin to the tip part of the cylinder unit, i.e., the lower portion of the screw by rotation of the screw while applying a back pressure thereon, and injecting the molten resin thus measured into the previously clamped mold by lowering (advancing) the screw.

As shown in FIGS. 2 and 3, two guide shafts 54 extending with a predetermined spacing in the perpendicular direction are so provided at the upper surface of the end part of the lower base 39. A screw holding member 58, which will hereinafter be described, is so supported on the two guide shafts 54 as to be movable in the up-and-down directions. More specifically, the screw holding member 58 includes protruded portions 58a formed with guide holes on both sides thereof. The guide shafts 54 are inserted into the protruded portions 58a, whereby the screw holding member 58 is movable in the up-and-down directions (perpendicular direction) while being guided by the two guide shafts 54. Further, an Upper base 73 serving as a molding apparatus body is fixed to the upper ends of the guide shafts 54.

The upper end of the screw 44 is integrally connected to the lower end of a screw extension shaft 56 by a screw fixing pin 55 so as to be incapable of rotating. A mid-part of the screw extension shaft 56 is rotatably supported on the screw holding member 58 through a pair of bearings 59. A first toothed pulley 56a is incorporated in the lower end part of the screw extension shaft 56 and fixed thereto with a key or nut.

A measuring motor 60 is integrally fixed to the screw holding member 58 through a measuring motor support stay 61. A torque of the measuring motor 60 is transferred via a first belt 62 to the first toothed pulley 56a, whereby the screw 44 is rotated together with the screw extension shaft 56.

Upper stopper members 64 and lower stopper members 65 are respectively fixed to the upper and lower portions of the two guide shafts 54 by fastening screws.

The uppermost and lowermost limit positions of the screw holding member 58 are regulated respectively by the two stopper members 64 and the two lower stopper members 65.

Further, one lower stopper member 65 is provided with an origin sensor 66a and a lower limit sensor 66b through a second sensor support stay 63. The origin sensor 66a is adapted to detect an origin of the screw holding member 58. The lower limit sensor 66b provided below the origin sensor 66a is adapted to detect a lower limit of the screw holding member 58. These origin and lower limit sensors 66a, 66b are employed upon seeking an origin of the injection unit 3.

On the other hand, two injection unit guide shafts 80 extending in parallel with each air cylinder 36 are integrally provided on the upper surface of the fixed platen 9. The injection unit guide shaft 80 penetrates a guide member 81 fixed to the upper and lower bases 73, 39, and supports the guide member 81 so that the guide member 81 is movable in the up-and-down directions. The screw holding member 58 and the injection unit 3 are constructed to be raised or lowered by protruding or retracting the respective rods 36a while being guided by each injection unit guide shaft 80. Based on this construction, during normal injection molding, the respective rods 36a of the two air cylinders 36 are retracted, thereby pushing the cylinder unit 2 to the mold against reactive force of the molten resin within the mold 6. Thus, the cylinder unit 2 is not separated from the mold 6 by the reactive force. Further, upon replacing the mold 6 with a change of the molded product as an object product, the injection unit 3 is raised by protruding the respective rods 36a of the two air cylinders 36, with the result that a large air space is formed between the mold 6 and the heating barrel 42 of the injection unit 3. Therefore, the replacing operation of the mold 6 is facilitated.

A load cell 67, which will be described later, is incorporated in the upper end part of the screw holding member 58. The load cell 67 serves to detect the reactive force of the molten resin within the mold 6.

Figure 11:
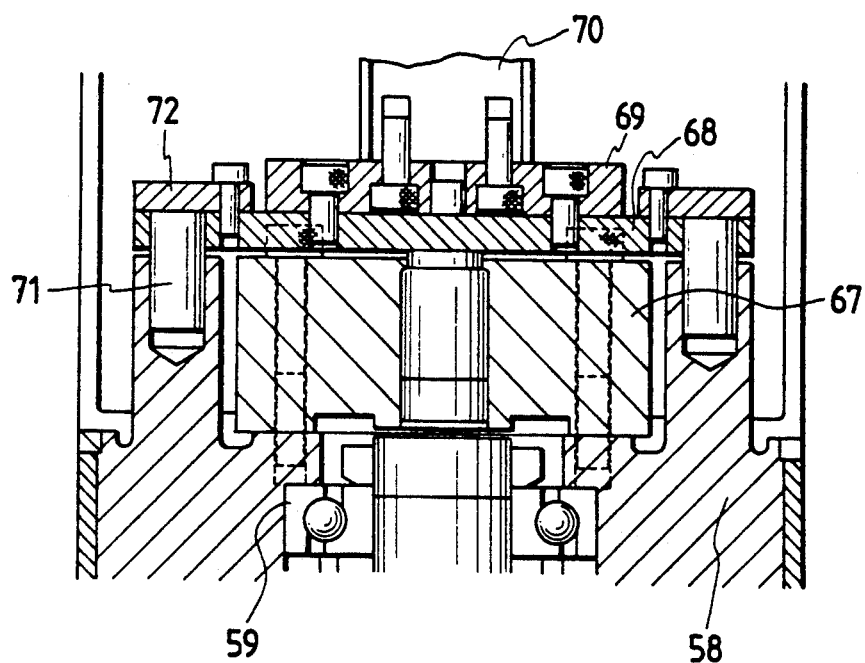
FIG. 11 is an enlarged view illustrating a load cell unit shown in FIG. 3.

A description of the structure of the load cell unit will be given with reference to FIG. 11 in detail. A connector plate 68 of a T-shape viewed sideways and having a screw portion at its central part is screwed and fixed in the central part of the load cell 67 with uniform spacing from the upper surface of the load cell 67. The lower end of a ball screw 70 is integrally connected via fitting plate 69 to the connector plate 68. Pins 71 provided integrally in guide plates 72 are penetrated at both end parts of the connector plate 68. The lower ends of the pins 71 are inserted respectively into two holes of the screw holding member 58.

Referring again to FIGS. 1, 2 and 3, on the basis of the construction thereof, the (upward) reactive force exerted on the screw 4 is transferred to the lower surface of the outer curved portion of the load cell 67 via the screw extension shaft 56 and the screw holding member 58, whereby a deflection force is generated in the load cell 67. The deflection force is converted into a voltage signal, whereby the reactive force applied on the screw 44 can be measured.

A ball nut 75 is provided internally and rotatably supported in the central part of the upper base 73 through a pair of bearings 74. The ball screw 70 is screwed into this ball nut 75, and a second toothed pulley 76 is fixed by fastening screw. The torque of an injection motor 78 is transferred via a second belt 77 to the second toothed pulley 76. The second toothed pulley 76 and the second belt 77 are combined to constitute a rotary motion transferring means. The central part of the second toothed pulley 76 is formed with a through-hole into which the ball screw 70 is loosely fitted. Even when the ball screw 70 rises, the ball screw 70 is constructed so as not to impinge on the second toothed pulley 76. Furthermore, a length of the ball screw 70 is set enough not to protrude from the second toothed pulley 76 even when the ball screw 70 rises to the uppermost end. With this arrangement, the torque of the injection motor 78 is converted into a rectilinear force by a ball screw mechanism. It is therefore possible to vertically move the screw holding member 58 and further the screw 44. Herein, the injection motor 78 is integrally fixed to the upper base 73 through an injection motor holding stay 79.

The ball screw mechanism is constructed in the manner discussed above, thereby effectively utilizing a moving space of the ball screw 70 and a space of the ball nut 75. It is feasible to make the height smaller than that in the conventional molding apparatus including the ball nut provided on the screw holding member.

Molded Product Take-Out Unit (Robot)

As illustrated in FIG. 4, a robot body 82 is fixedly supported on the fixed platen 9. The robot body 82 is fitted with an arm 83. The arm 83 is moved by an unillustrated driving means in the vertical and horizontal directions with respect to the robot body 82. The tip end part of the arm 83 is provided with a hand 84 for handling a workpiece. The hand 84 picks up the molded product 22 (see FIG. 6) on the two ejector pins 23 (see FIG. 6) when the arm 83 is in a pick-up position L. When the arm 83 is in a workpiece release position N, the arm 83 releases the molded product 22 thus picked up. Further, during injection molding, the arm 83 stands by in a standby position M as middle portion between the pick-up position L and the workpiece release position N. The robot body 82 is provided with a standby position sensor 85. The standby position sensor 85 serves to detect whether or not the arm 83 is in the standby position M upon starting the molding process.

Disposed at the side of the molding apparatus in this embodiment is a conveyor for conveying assembled parts into which the molded product picked up by the robot is assembled.

Figure 5:
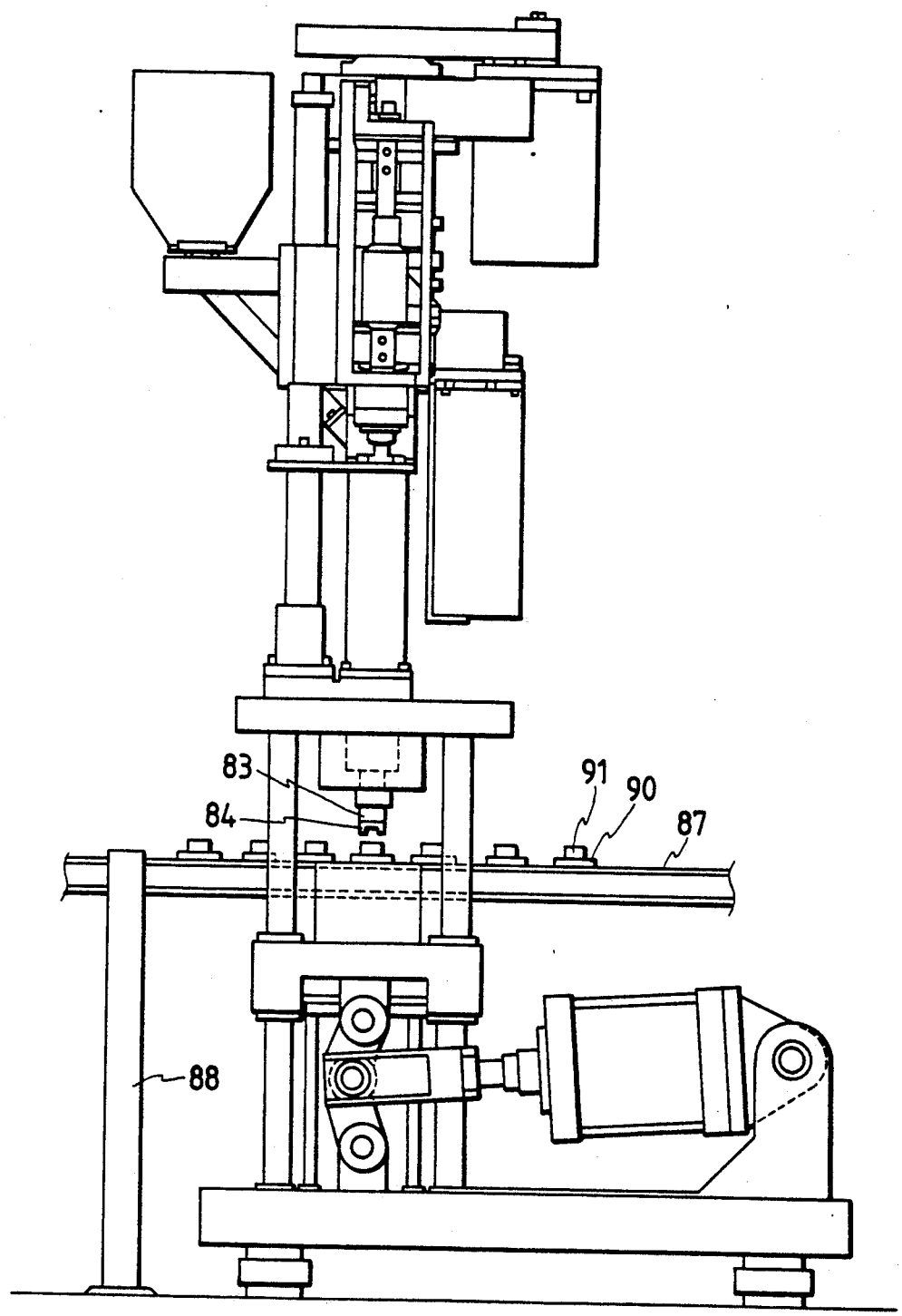
FIG. 5 is a view similar to FIG. 2 in which the molded product take-out unit, the conveyor, and the like are illustrated, showing a state where the mold is opened.

As shown in FIGS. 4 and 5, the conveyor 86 is constructed in such a manner that a conveying belt 87 is so supported by stays 88 fixed onto the floor as to be movable in the horizontal direction through pulleys (not shown) rotatively driven by a motor 89. A height from the floor to a conveying surface of the conveying belt 87, i.e., a height of the conveyor 86, is set typically to be easy to operate it (900 mm thereabouts) by an operator. A height position of the two ejector pins 23 (see FIG. 6), i.e., a take-out height, is also substantially equal to the height of the conveyor 86. A conveying surface of the conveying belt 87 is provided with pallets 90 for mounting assembled parts 91 into which the molded products 22 (see FIG. 6) are assembled.

The assembled part 91 running together with the conveying belt 87 while being placed on the pallet 90 arrives under the hand 84 when the arm 83 is in the workpiece release position N. Then, the assembled part 91 is floated together with the pallet 90 from the conveying belt 87 and positioned by an unillustrated positioning unit. Subsequently, the molded product 22 immediately after being molded by the molding apparatus is assembled into the positioned part 91 by means of the robot. Then, the conveying belt 87 is moved again. In this manner, the assembling of the molded products 22 into the assembled parts 91, i.e., the supply of the parts is remarkably simple and quick. There is no necessity for carrying the molded parts to the assembling process or storing them. Therefore, dust is prevented from adhering to the molded parts, and a considerable reduction in terms of costs for supplying the parts is attainable.

Figure 12:
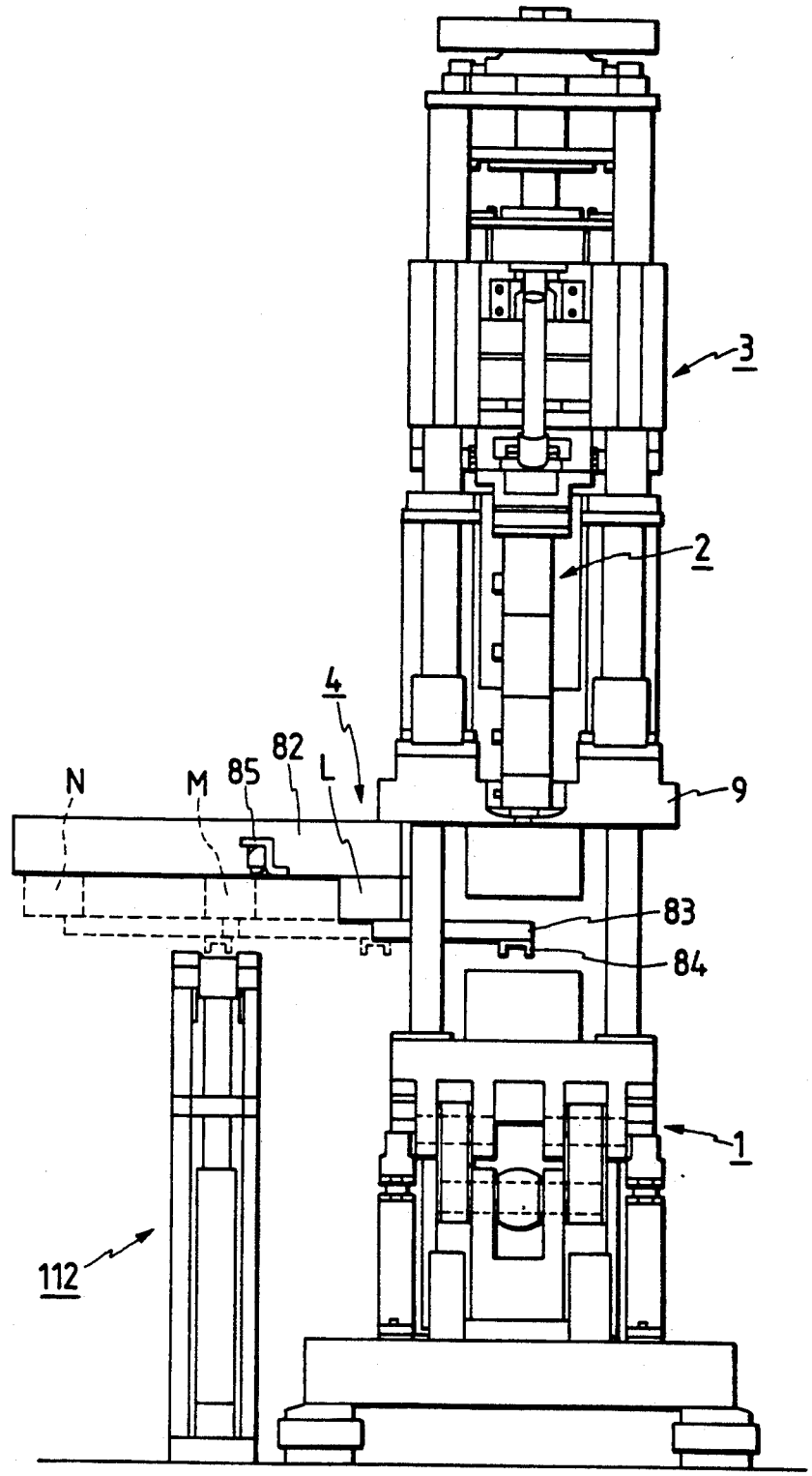
FIG. 12 is a view similar to FIG. 4, showing a case where a tape cassette is used in place of a conveying device (conveyor)

As illustrated in FIG. 12, instead of the above-mentioned conveyor, a tape cassette (stocker) 112 may be disposed at the side of the molding apparatus. The tape cassette 112 includes a tape for storing the molded parts 22 (see FIG. 6) molded by the molding apparatus, thereby facilitating the assembling of the molded parts 22 through an automatic device or the like. The operations of the tape cassette 112 and of the molding apparatus are synchronized with each other through an optical communication interface defined as a non-contact communication means.

Figure 13A:
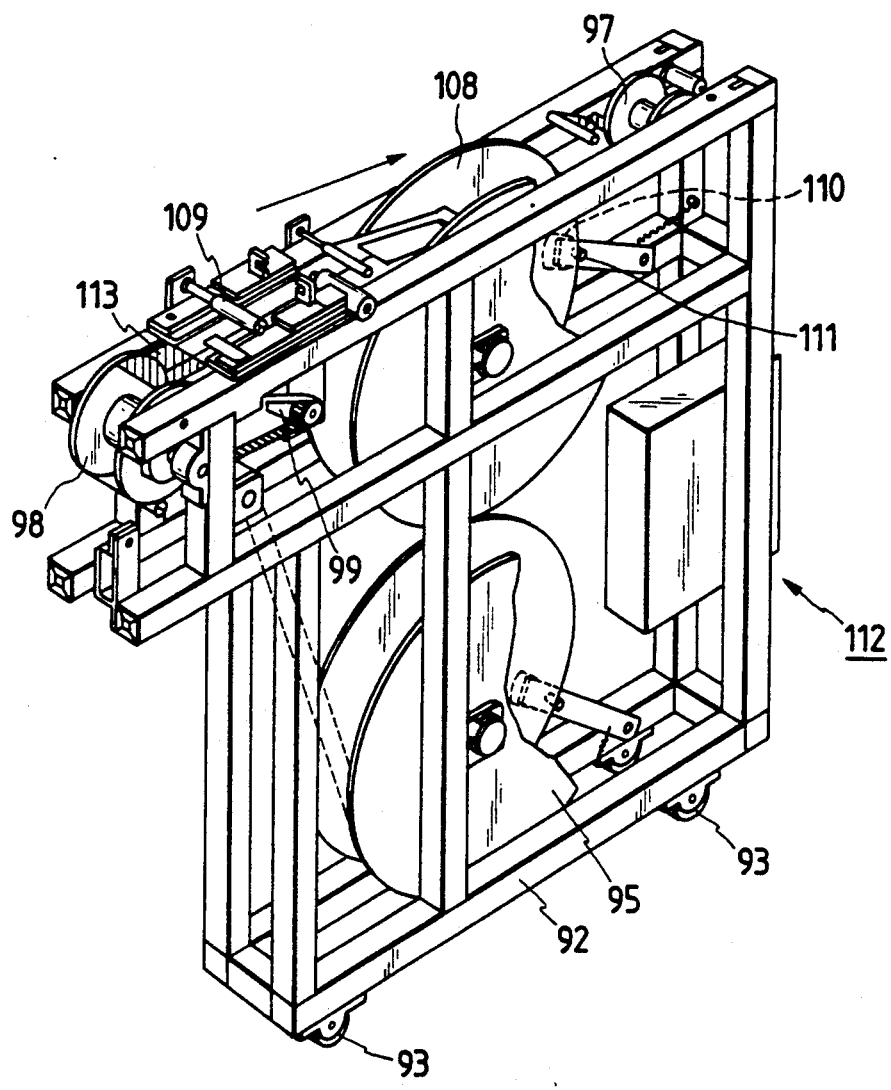
FIGS. 13A and 13B are views illustrating the tape cassette shown in FIG. 12, FIG. 13A being an enlarged perspective view, and FIG. 13B being an enlarged view illustrating the principal portion of FIG. 13A.
Figure 13B:
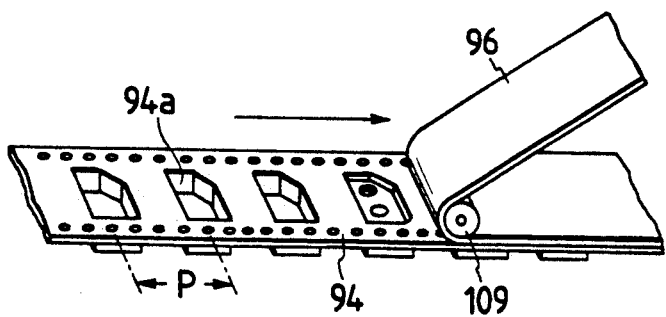
Figure 14:
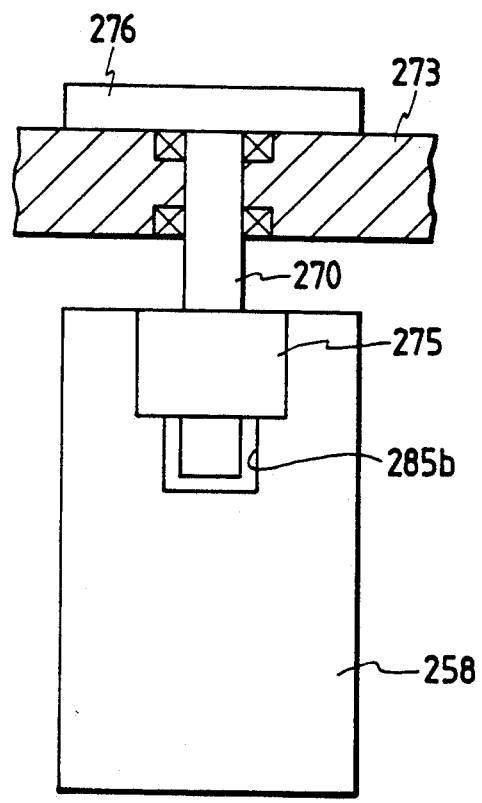
FIG. 14 is a schematic block diagram illustrating the principal portion of an injection unit of a conventional motor-driven vertical type injection molding apparatus.

FIGS. 13A and 13B depict the tape cassette (stocker) 112. FIG. 13A is a schematic perspective view thereof. FIG. 13B is a perspective view illustrating the principal portion of FIG. 13A, i.e., a portion where a cover tape is laid across a molded-part holding tape. The following is a detailed explanation of structure of the tape cassette 112.

A frame body 92 as a tape cassette body has a plurality of casters 93 and is thereby easily movable in all directions on the floor. Around a take-up driven roller 95 supported on the frame body 92 is wound in advance a molded-part holding tape 94 formed with a multiplicity of recesses 94a at predetermined intervals (pitch P) in the longitudinal direction. The recesses 94a match the shapes of the molded parts. A cover tape 96 is wound in advance around a cover tape roller 97 supported on the frame body 92. Further, the outer curved surface of a take-up driving roller 108 contacts a driving roller 111. The driving roller 111 is rotated by a take-up motor 110, whereby the take-up driving roller 108 is rotated by a frictional force between the take-up driving roller 108 and the driving roller 111. A sprocket 98 is rotated stepwise by the pitch P through a sprocket driving motor 99.

When using the tape cassette 112, one end of the molded-part holding tape 94 is fixed to the take-up driving roller 108 after passing through the sprocket 98. One end of the cover tape 96 is fixed to one end of the (empty) molded-part holding tape 94 after passing through a cover guide 109.

Then, when the sprocket driving motor and the take-up motor 110 are driven, the molded-part holding tape 94 is fed stepwise by the pitch P towards the take-up driving roller 108. The tape 94 is then covered with the cover tape 96 and wound around the take-up driving roller 108. At this moment, slack in the molded-part holding tape 94 can be prevented by making a take-up speed of the take-up motor 110 faster than a feeding speed of the sprocket driving motor 99. When the molded-part holding tape 94 is wound around the take-up driving roller 108, the molded part 22 (see FIG. 6) caught by the robot hand 84 (see FIGS. 4 and 5) is put in the recess 94a of the molded-part holding tape 94 in a handling zone (hatching portion in the figure) 113 defined as a position just before the cover tape 96 is covered on the molded-part holding tape 94.

With a multiplicity of repeating such operations, the multiplicity of molded parts are accommodated in alignment in the molded-part holding tape 94. The molding apparatus, the robot and the tape cassette are combined in this way, and it is therefore possible to effect the molding process, to take out the molded parts and to successively automatically accommodate the molded parts in alignment.

Next, the operation of the molding apparatus in this embodiment will be described with reference mainly to FIGS. 1 to 4.

To start with, the mold 6 is cleaned beforehand, and molding preparations such as supply of a molding material (pellet) 51b to the hopper 51 (see FIG. 10) are performed.

Upon turning on the power supply with completion of the molding preparations, temperatures of the band heaters 48a, 48b are controlled. Further, the protruded portions 58b of the screw holding member 58 are detected by the origin sensor 66a and the lower limit sensor 66b, thus seeking the origin. A position of the origin is a position of the screw holding member 58, i.e., a position of the screw 44 upon finishing the seeking of the origin.

Based on the operation of the above-described air supply circuit (see FIG. 8), the mold is then closed under two-step pressure control. Subsequently, the injection unit 3 is lowered by retracting the rods 36a of the two air cylinders of the injection unit 3. The nozzle 40 (see FIG. 9) of the heating barrel 42 thereof remains pushed against the fixed die (upper die) 7.

The screw 44 is advanced to the foremost position (lowermost position) by the injection motor 78 and then rotated by actuating the measuring motor 60. The molding material fed from the hopper 51 via the chute 50 into the heating barrel 42 is transferred to the tip end portion thereof by rotation of the screw 44. At this time, the molding material within the heating barrel 42 is heated from the outer surface by means of the band heaters 48, and a frictional heat is also generated by the mixing action between the screw 44 and the heating barrel 42. The heat is thereby internally generated, resulting in a rise in the temperature. During rotation of the screw 44, the screw 44 is pushed back upward by the reactive force of the molten resin 46 (see FIG. 9) which has been transferred to the tip end part and preserved therein. The reactive force is detected by the load cell 67. The retracting amount due to the reactive force is, however, regulated (back pressure) by controlling the torque of the injection motor 78. Mixing of the air or the like is thus prevented, and a necessary injection quantity is obtained (measurement). After the measurement, the rotation of the screw 44 is stopped. Further, the screw 44 is slightly pulled up (sucked back) by the injection motor 78 in order to prevent resin sagging from the nozzle 40.

After effecting the suck-back, the screw 44 is rapidly advanced (lowered) by the injection motor 78. The molten resin 46 of the tip end part thereof is injected into the mold 6 at a high speed (injecting process). Thereafter, the screw 44 is stopped by the injection motor 78, and dwelling is performed to hold an injection pressure. After cooling the mold 6 for a necessary time, the mold 6 is opened. Just before completion of opening, the impingement member 31 supported on the mount 4a impinges on the ejector plate 21 (see FIG. 6), whereby the two ejector pins (see FIG. 6) are protruded from the cavity bottom surface of the movable die 8. The molded product 22 (see FIG. 6) is thus ejected and then held.

Upon completion of opening, the arm 83 of the molded product take-out unit 4 which is located in the standby position M moves in the horizontal direction and stops in the pick-up position L. The hand 84 thereof picks up the molded product 22 on the two ejector pins 23. Thereafter, the arm 83 moves to the workpiece release position N. Subsequently, the hand 84 supplies and assembles the molded product 22 into one assembled part 91 placed on the pallet 90 on the conveyor 86. Thereafter, executed successively are the injection molding, and take-out (pick up) and assembling of the molded product described above. Then, the above-mentioned operations are successively repeated at a plurality of cycles, thereby obtaining a multiplicity of assembled parts into which the molded products are assembled.

Given next is an explanation of procedures of replacing the screw head and the backflow preventive ring in the molding apparatus in this embodiment with reference to FIGS. 3 and 9.

After the injection unit 3 is raised by use of the two air cylinders 36, the cylinder head 41 is removed from the heating barrel 42, and the two lower stopper members 65 screwed to the two guide shafts 54 are removed respectively from the two guide shafts 54. Then, the screw holding member 58 is descended due to its dead weight together with the screw 44. The screw holding member 58 and the screw 44 reach the lowermost limit position. Consequently, the screw head 45 and the backflow preventive ring 47 appear outside the heating barrel 42. Herein, the screw head 45 and the backflow preventive ring 47 are removed, and instead new ones are mounted, thus effecting the replacement. Subsequently, after the screw 44 has been slightly raised, the two lower stopper members 65 removed are mounted on the two guide shafts 54, respectively. Finally, the cylinder head 41 is screwed and fitted to the heating barrel 42. The replacements of the screw head 45 and the blackflow preventive ring 47 are thus completed.

The present invention is constructed as described above and therefore exhibits the following effects.

The screw holding member is integrally provided with the ball screw. On the other hand, in the molding apparatus body, the ball nut screwed to the ball screw is rotatably embedded. This arrangement eliminates the necessity for providing the screw holding member with the ball nut and the relief portion of the ball screw as in the conventional case. Also height dimensions of the ball nut and of the relief portion are absorbed respectively by the thickness of the molding apparatus body and by the height of the rotary motion transferring means. For this reason, as the height of the motor-driven vertical type injection molding apparatus can be reduced corresponding to the heights of the ball nut and of the relief portion as compared with the conventional case. This makes it possible to install the apparatus in a low-ceilinged clean room or the like in which it could not be installed in the conventional case.

Although the illustrative embodiments of the present invention have been described in detail with reference to the accompanying drawings, it is to be understood that the present invention is not limited to those embodiments.

What is claimed is:

1. A motor-driven vertical injection molding apparatus including;

a screw holding member for rotatably holding a screw accommodated in a heated barrel, said screw extending in a vertical direction;

a vertical driving mechanism for converting torque into a rectilinear force to rectilinearly move said screw, said vertical driving mechanism comprising;

a ball screw integrally provided on said screw holding member and extending in the vertical direction;

a ball nut rotatably provided internally in a molding apparatus body and screwed to said ball screw; and rotation transferring means, provided on an upper part of said ball nut and formed with a through-hole into which said ball screw is loosely fitted, for transferring the torque to said ball nut, wherein a length of said ball screw is set so that an upper end of said ball screw does not protrude from said rotation transferring means even when said ball screw rises up to an uppermost limit thereof; and an injection motor connected to said screw holding member through said vertical driving mechanism and providing torque thereto.

* * * * *

UNITED STATES PATENT AND TRADEMARK OFFICE
CERTIFICATE OF CORRECTION

PATENT NO. : 5,332,382
DATED : July 26, 1994
INVENTOR(S) : Kasai et al.

It is certified that error appears in the above-indentified patent and that said Letters Patent is hereby corrected as shown below:

On the title page:
[56] REFERENCES CITED:

U.S. PATENT DOCUMENTS, please insert:
--5,110,522  5/1992  Inaba et al. .............. 264/40.4--

COLUMN 13:

Line 8, "comprising;" should read --comprising:--.

Signed and Sealed this

Seventeenth Day of January, 1995

Attest:

BRUCE LEHMAN

Attesting Officer     Commissioner of Patents and Trademarks